(12) United States Patent
Donneau-Golencer

(10) Patent No.: US 9,594,850 B2
(45) Date of Patent: Mar. 14, 2017

(54) METHOD AND SYSTEM UTILIZING A PERSONALIZED USER MODEL TO DEVELOP A SEARCH REQUEST

(71) Applicant: SRI International, Menlo Park, CA (US)

(72) Inventor: Thierry D. Donneau-Golencer, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 24 days.

(21) Appl. No.: 14/511,999

(22) Filed: Oct. 10, 2014

(65) Prior Publication Data

US 2015/0046435 A1 Feb. 12, 2015

Related U.S. Application Data

(63) Continuation of application No. 13/298,374, filed on Nov. 17, 2011, now Pat. No. 8,868,590.

(51) Int. Cl.
*G06F 17/30* (2006.01)
(52) U.S. Cl.
CPC .... *G06F 17/30967* (2013.01); *G06F 17/3053* (2013.01); *G06F 17/30699* (2013.01)
(58) Field of Classification Search
CPC ......... G06F 17/30699; G06F 17/30967; G06F 17/3053
See application file for complete search history.

(56) References Cited

U.S. PATENT DOCUMENTS

| | | | |
|---|---|---|---|
| 6,493,702 B1 * | 12/2002 | Adar | G06F 17/30884 707/706 |
| 6,981,040 B1 | 12/2005 | Konig et al. | |
| 7,130,861 B2 * | 10/2006 | Bookman | G06F 17/3061 |
| 7,260,573 B1 * | 8/2007 | Jeh | G06F 17/30613 707/708 |
| 8,135,729 B2 * | 3/2012 | Brewer | G06F 17/3097 707/767 |
| 8,171,032 B2 | 5/2012 | Herz | |
| 2004/0044516 A1 * | 3/2004 | Kennewick | G10L 15/22 704/5 |
| 2004/0267700 A1 | 12/2004 | Dumais et al. | |
| 2005/0071328 A1 | 3/2005 | Lawrence | |

(Continued)

OTHER PUBLICATIONS

Response to Final Office Action, filed Apr. 25, 2013 for U.S. Appl. No. 13/149,536, 13 pages.

(Continued)

*Primary Examiner* — Leslie Wong
(74) *Attorney, Agent, or Firm* — Barnes & Thornburg LLP

(57) ABSTRACT

A method and system for developing a computer-executable query relating to a search request issued by a user includes determining whether a search term of the search request has a user-specific meaning, connotation, context, or association based on an analysis of electronic content associated with the user and/or an analysis of interactions of the user with electronic content that is accessible to the user through one or more computing devices. If the search term has a user-specific meaning, connotation, context, or association, the method and system can incorporate the user-specific meaning, connotation, context, or association into the search request and/or the computer-executable query.

19 Claims, 6 Drawing Sheets

(56) References Cited

U.S. PATENT DOCUMENTS

| | | | |
|---|---|---|---|
| 2005/0240580 A1* | 10/2005 | Zamir | G06F 17/30867 |
| 2006/0230022 A1* | 10/2006 | Bailey | G06F 17/3064 |
| 2007/0033531 A1* | 2/2007 | Marsh | G06Q 30/02 |
| | | | 715/738 |
| 2007/0130126 A1 | 6/2007 | Lucovsky et al. | |
| 2008/0140643 A1* | 6/2008 | Ismalon | G06F 17/3053 |
| 2008/0221892 A1 | 9/2008 | Nathan et al. | |
| 2009/0006543 A1* | 1/2009 | Smit | G06F 17/30864 |
| | | | 709/203 |
| 2009/0150342 A1* | 6/2009 | Muller | G06F 17/30967 |
| 2009/0164441 A1 | 6/2009 | Cheyer | |
| 2009/0216696 A1* | 8/2009 | Downs | G06F 17/30675 |
| | | | 706/20 |
| 2010/0145976 A1* | 6/2010 | Higgins | G06F 17/3064 |
| | | | 707/765 |
| 2010/0179961 A1 | 7/2010 | Berry et al. | |
| 2010/0180200 A1 | 7/2010 | Donneau-Golencer et al. | |
| 2010/0287033 A1 | 11/2010 | Mathur | |
| 2011/0055186 A1* | 3/2011 | Gopalakrishnan | G06F 17/30867 |
| | | | 707/706 |
| 2011/0295612 A1 | 12/2011 | Donneau-Golencer et al. | |
| 2012/0233142 A1* | 9/2012 | Lawrence | G06F 17/3053 |
| | | | 707/706 |
| 2013/0041921 A1* | 2/2013 | Cooper | G06F 17/30672 |
| | | | 707/780 |
| 2013/0282713 A1 | 10/2013 | Lawrence | |

OTHER PUBLICATIONS

Final Office Action for U.S. Appl. No. 13/149,536, dated Feb. 25, 2013, 26 pages.

U.S. Appl. No. 13/149,319, filed May 31, 2011 to Donneau-Golencer, et al. (Unpublished).

U.S. Appl. No. 13/114,691, filed May 24, 2011 to William S. Mark (Unpublished).

"C2RSS" Overview, downloaded on Oct. 12, 2011 from website: https://pal.sri.com/Plone/framework/Components/learning-applications/c2rss, no date, 3 pages, In U.S. Appl. No. 13/298,374.

"Trapit" downloaded on Oct. 12, 2011 from website: http://trap.it/#!about, founded Jan. 2010, 2 pages, In U.S. Appl. No. 13/298,374.

U.S. Appl. No. 13/336,360, filed Dec. 23, 2011 to Donneau-Golencer, et al. (Unpublished).

* cited by examiner

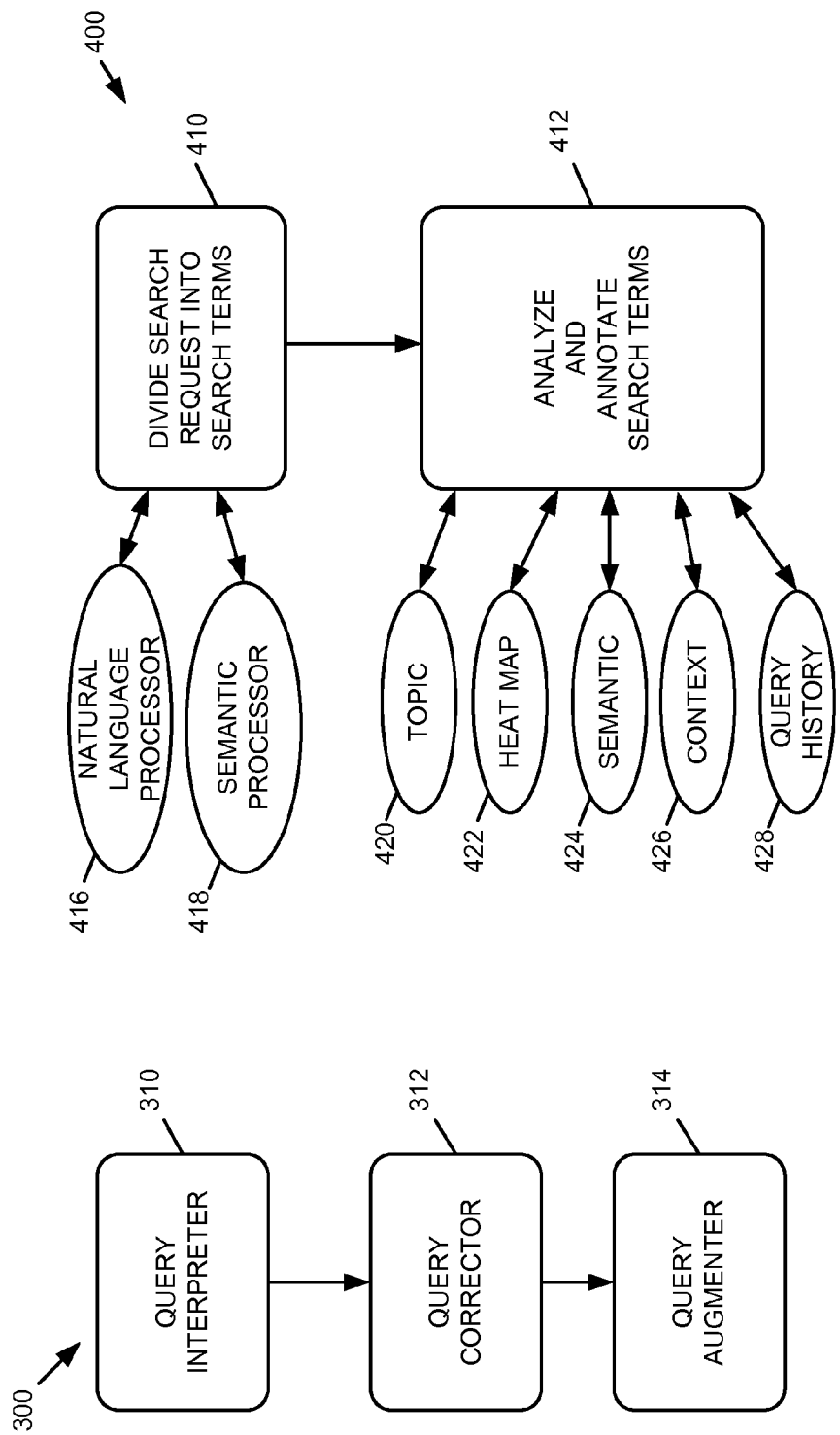

METHOD AND SYSTEM UTILIZING A PERSONALIZED USER MODEL TO DEVELOP A SEARCH REQUEST

CROSS-REFERENCE TO RELATED APPLICATION

This application is a continuation of, and claims the benefit of and priority to U.S. Utility application Ser. No. 13/298,374, filed Nov. 17, 2011, which is U.S. Pat. No. 8,868,590, issue date Oct. 21, 2014, and is incorporated herein by this reference in its entirety.

GOVERNMENT RIGHTS

This invention was made in part with government support under contract number FA87150-07-D-01185 awarded by The United States Air Force Research Laboratory. The Government has certain rights in this invention.

BACKGROUND

Many users demand efficiency in their online interactions and expect to obtain the information they need from their computing devices in the shortest possible amount of time. It can be challenging and even frustrating for these users to find the information they need in a computing system quickly. One reason for this is that conventional search engines often treat the user's query as a set of keywords, with little or no effort to interpret the underlying meaning or connotation of the user's request. As a result, it may take a person several attempts at searching to find the desired information, or the search effort may even end in failure.

In addition, many people are accustomed to using very short phrases, abbreviations, acronyms, truncated words, or their own 'shorthand,' in their computing activity. This is often a result of the desire for speed and the small size and limited keyboard of many mobile computing devices. The increasing popularity of text messaging and online services such as TWITTER, LINKEDIN, and/or other applications that impose character limits may also encourage brevity. Moreover, whether or not a search request is particularly succinct, it may contain terms that have a special meaning or connotation, which is personal to the particular user but which may not be readily discernible using traditional query analysis techniques.

Some electronic search systems have used public dictionaries, query logs, search engine usage characteristics, crowd sourcing and/or consensus relevancy methods in an effort to better resolve the intention of a search request. However, these tools and techniques typically are not well equipped to determine when a search term has a user-specific meaning or connotation, or to determine the user-specific meaning of a search term. As a result, the search may return results that have little or no relevance to the information the user was seeking.

With the incorporation of Global Positioning Systems (GPS) or similar technology into many computing devices, search engines may now have access to useful information about the user's current geographic location and nearby people, places or things. Such information can be used to improve or enhance search results where current geographic location is a relevant aspect of the information desired (e.g., a search for local stores, gasoline stations, etc.). However, without more, this information may be of little utility more generally, e.g. for searches that are not primarily location-oriented.

SUMMARY

According to at least one aspect of this disclosure, a method includes maintaining, in an automated fashion, a user-specific profile that includes information relating to at least one electronic interaction of a user with at least one content, where the at least one content is accessible to the user through at least one computing device. The method includes receiving a search request from the user, where the search request includes at least one search term. The method also includes determining whether the at least one search term has an association with the information in the user-specific profile. If a search term has an association with the information in the user-specific profile, the method includes formulating at least one computer-executable query based on the search request and based on the association of the search term with the information in the user-specific profile.

The method may include replacing the search term with at least one word relating to the association of the search term with the information in the user-specific profile. The method may include adding to the search request at least one word relating to the association of the search term with the information in the user-specific profile. The at least one word is added to either broaden or narrow the scope of the search request.

The method may include conducting at least one of a natural language analysis, semantic analysis, topic analysis, heat map analysis, context analysis, and query history analysis of the at least one search term using the user-specific profile.

The method may include formulating a first alternative search request based on a first association of the search term with first information in the user-specific profile and formulating a second alternative version of the search request. The method may include formulating the second alternative version of the search request based on a second association of the search term with second information in the user-specific profile.

The method may include outputting at least one of the alternate versions of the search request in a form that is at least one of perceptible, editable and selectable by the user. The method may include executing a first computer-executable query formulated based on the first alternative search request to generate a first search result, executing a second computer-executable query formulated based on the second alternative search request to generate a second search result, and selecting one of the first and second search results.

The method may include analyzing a plurality of words in the user-specific profile, determining associations between or among the words, determining weights assigned to one or more of the words, and formulating the at least one computer-executable query based on at least one of: a word in the user-specific profile, an association between or among words in the user-specific profile, and a weight assigned to one or more words in the user-specific profile.

The method may include creating at least one alternate version of the search request including a user-specific meaning of at least one search term. The method may include selecting one of the alternate versions of the search request. The method may include outputting the at least one alternate version of the search request in a form that is at least one of perceptible, editable, and selectable by the user prior to the formulating of the at least one computer-executable query.

The at least one search term may include an acronym having a user-specific meaning, and the method may include determining the user-specific meaning of the acronym using the user-specific profile. The at least one search term may include an abbreviation or truncated word having a user-specific meaning, and the method may include determining the user-specific meaning of the abbreviation or truncated word using the user-specific profile. The at least one search term may include a proper noun having a user-specific meaning, and the method may include determining the user-specific meaning of the proper noun using the user-specific profile. The at least one search term may include an unknown word, and the method may include accessing the user-specific profile to automatically resolve the unknown word prior to formulating the computer-executable query.

The method may include accessing the user-specific profile to automatically associate at least one related word, topic, sub-topic, concept, context or connotation with the search term prior to formulating the at least one computer-executable query. The method may include automatically modifying the search request to include the at least one related word, topic, sub-topic, concept, context or connotation associated with the search term as the user is inputting the search request.

The method may include executing the computer-executable query, evaluating the results of the executing of the query, and generating at least one alternate version of the search request based on the results of the executing of the query.

The method may include monitoring at least one electronic interaction of the user in response to the determining of whether the at least one search term has an association with the information in the user-specific profile or the formulating of the at least one computer-executable query, and updating at least one of the search request, the computer-executable query, and the user-specific profile based on the monitoring.

Also, according to at least one aspect of this disclosure, at least one computer accessible medium includes a plurality of instructions that in response to being executed, result in a computing device receiving a search request from a user, where the search request includes at least one search term, accessing a user-specific profile comprising words, associations between or among the words, and weights assigned to one or more of the words, the user-specific profile being automatically created as a result of an automated analysis of electronic content associated with the user, analyzing the at least one search term using the user-specific profile to interpret, correct, or augment the at least one search term, and formulating a computer-executable query corresponding to the search request and based on a user-specific interpretation, correction or augmentation of the at least one search term.

The executing of instructions may result in the computing device receiving input from the user relating to at least one of the user-specific interpretation, correction or augmentation of the at least one search term, and updating at least one of the search request, the computer-executable query, and the user-specific profile based on the input from the user.

Further, according to at least one aspect of this disclosure, a computing device includes at least one processor, and at least one memory device coupled to the at least one processor, where the at least one memory device includes stored therein a plurality of instructions that when executed by the at least one processor, cause the at least one processor to identify at least one search term of a search request received from a user, access a database comprising words, associations between or among the words, and weights assigned to one or more of the words, wherein the words, associations, and weights in the database are derived from an automated analysis of electronic content and interactions associated with the user, determine at least one user-specific meaning of the at least one search term using the database, and formulate a computer-executable query corresponding to the search request and based on the user-specific meaning of the at least one search term.

The instructions, when executed by the at least one processor, may cause the at least one processor to receive input from the user relating to the user-specific meaning, and update at least one of the search request, the computer-executable query, and the database in response to the input from the user.

BRIEF DESCRIPTION OF THE DRAWINGS

The invention described herein is illustrated by way of example and not by way of limitation in the accompanying figures. The figures may, alone or in combination, illustrate one or more embodiments of the invention. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a simplified flow diagram for a method of query development;

FIG. 4 is a simplified flow diagram for a method of interpreting a search request;

DETAILED DESCRIPTION OF THE DRAWINGS

Figure 1:
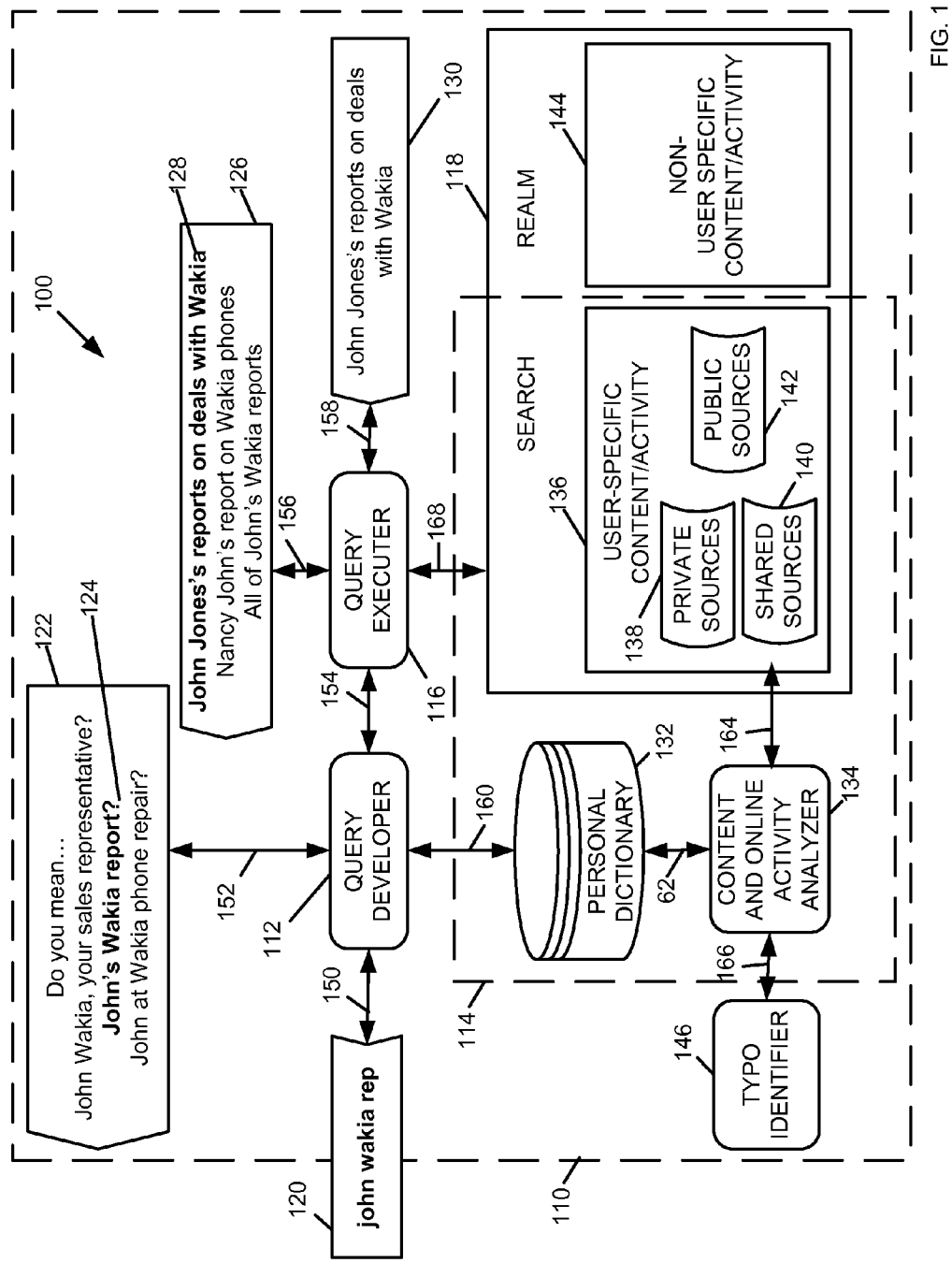
FIG. 1 is a simplified block diagram of an information retrieval system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details are set forth in order to provide a more thorough understanding of the present disclosure. It will be appreciated, however, by one skilled in the art that embodiments of the disclosure may be practiced without such specific details. In some instances, details such as control structures and full software instruction sequences have not been shown in order not to obscure the invention. Those of ordinary skill in the art, with the included descriptions, will be able to implement appropriate functionality without undue experimentation.

References in the specification to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored using one or more machine-readable media, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and/or others.

In the drawings, specific arrangements or orderings of schematic elements, such as those representing devices, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C#, C++, Ruby, and/or other programming languages. In some embodiments, an open source information retrieval software library, such as LUCENE, may be used.

Similarly, schematic elements used to represent data or information may be implemented using any suitable electronic arrangement or structure, such as a database, data store, table, record, array, index, hash, map, tree, list, graph, file (of any file type), folder, directory or other grouping of files, header, web page, meta tag, and/or others. For example, in some embodiments, an open source distributed database system, such as CASSANDRA, may be used.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association exists. In other words, some connections, relationships or associations between elements may not be shown in the drawings so as not to obscure the invention. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths, as may be needed, to effect the communication.

Referring now to FIG. 1, an illustrative information retrieval system 100 is embodied in a computing device 110. The information retrieval system 100 may be embodied as a stand-alone software application, or may be embedded in or accessed by one or more other applications. For example, all or portions of the information retrieval system 100 may be incorporated into other systems or software applications that have a search feature. Such applications or systems may include, for example: operating systems, web browsers, word processing software, electronic mail systems, social networking systems, application-specific information retrieval systems, and web- or mobile device-based applications for trip or vacation planning, online shopping, research, newsgathering, music and/or video sharing, and/or others.

Further, the information retrieval system 100 may be local to a particular computing device 110, or may be distributed across multiple computing devices 110. Illustrative embodiments of the information retrieval system 100 and the computing device 110 are described below with reference to FIG. 7.

The information retrieval system 100 includes a query developer module 112, which interfaces with a user-specific model or "personal user model" 114, to interpret the search term(s) of a search request 120, determine user-specific meanings of the search terms, and/or augment the search request 120 with additional search terms as may be needed. The term "user-specific meaning" as used herein may include, for example, one or more of the following: user-specific definitions, connotations, and/or associations or relationships with other search terms, words, higher-level concepts, related topics and/or sub-topics, context information and/or other reference information that is particular to the user issuing the search request 120.

The query developer 112 uses the interpreted and/or augmented search terms to formulate one or more computer-executable queries that correspond to the search request 120.

The information retrieval system 100 also includes a query executer module 116, which interfaces with the query developer 112 and a search realm 118 to execute the computer-executable query(ies) generated by the query developer 112.

In general, the search realm 118 includes one or more electronically retrievable data or information elements, such as word processing documents, spreadsheets, presentation slides, text, image, audio, video, or multimedia files; web pages, electronic messages, attachments to electronic messages, calendar events, address book entries, task list entries, notes, comments, and individual pieces of content or information stored in any location that is accessible to the information retrieval system 100, including, for example, personal, shared, or public services, applications, databases, document management systems, contact management systems and/or customer relationship management (CRM) systems, a combination of any of the foregoing, and/or others.

As shown in FIG. 1, the illustrative search realm 118 includes a personal corpus or body of user-specific content and interactions 136, and may include non-user specific content and activity 144. Examples of user-specific content and interactions 136 are described below in connection with a discussion of the user-specific model 114.

Some examples of non-user specific content and/or activity 144 include information that is publicly available on the Internet, or through Internet-based applications or other networked or online services, such as: news articles, educational information, maps, address and/or phone directories, geographic information such as time zones, zip codes, and currency conversions; and product or service descriptions, as well as crowd-sourcing data such as public dictionaries or thesauruses (e.g., DICTIONARY.COM), domain-specific dictionaries and/or ontologies (e.g. medical, legal, or scientific dictionaries and/or ontologies), public knowledge bases (such as WIKIPEDIA), lists of search terms that are most frequently used by a population of users, and rankings of online content that have been most frequently or most recently accessed by a population of users.

The query executer 116 returns one or more results 130 retrieved from the search realm 118, or no results, in response to the computer-executable query formulated by the query developer 112 for the search request 120. The results 130 may be presented to the user in any suitable form, such as a list, table, or matrix of data, hyperlinks, text, image, audio, audiovisual files, thumbnail files, and/or other items.

In operation, the information retrieval system 100 receives a search request 120 at the computing device 110. The search request 120 may be input by a user in any suitable form that can be processed by the computing device 110, including text (e.g. typed or handwritten), speech, or others. In some embodiments, the search request 120 may be automatically generated by the computing device 110 without user input.

The search request 120 may include keywords or natural language, and may include one or more search terms, each of which may, alone or in combination, have one or more user-specific meanings, connotations, contexts, or associations, which are particular to the user associated with the search request 120. For example, a search term may include a truncated, shorthand, or abbreviated form of a word or phrase, an acronym, a nickname, or a proper noun, the meaning of which is particular to the user submitting the search request 120 and therefore cannot be accurately determined from public dictionaries or by standard query analysis techniques. The query developer 112 uses the user-specific model 114 to determine whether a search term has a user-specific meaning and if so, to discern the user-specific meaning and incorporate the user-specific meaning into the corresponding computer-executable query, as will be explained further below.

As indicated by the bidirectional arrows 150, 152, 154, and 160, the creation and/or analysis of the search request 120 may be an iterative process. For example, in some embodiments, the query developer 112 may analyze the search request 120 as it is being input by the user, and automatically correct or complete the search request 120 "on the fly" (e.g. in real time) based on the user's input and/or information obtained by the query developer 112 from the user-specific model 114. Also, at any time during its processing of the search request 120, the query developer 112 may output the search request 120, and/or one or more modified or alternate versions thereof, in any suitable form that is perceptible to the user (using, for example, text boxes, windows, or other suitable user interface techniques), and may enable the user to directly edit the search request 120 at that time.

Alternatively or in addition, the query developer 112 may generate one or more intermediate search requests 122, based on its analysis of the search terms of the original search request 120 using the user-specific model 114. As compared to the search request 120, each of the intermediate search requests 122 may include additional or different search terms or modifications of search terms, as a result of interactions between the query developer 112 and the user-specific model 114.

In some embodiments, the query developer 112 may present the intermediate search requests 122 to the user and wait for the user to select a desired one of the intermediate search requests 122 (e.g. intermediate search request 124) for further processing. In other embodiments, the query developer 112 may automatically (e.g., without user input) select an intermediate search request 122, based on information gleaned from the user-specific model 114, instead of displaying the intermediate search requests 122 and waiting for the user to make a selection. Also, at any time during its processing, the query developer 112 may output the intermediate search request 122, and/or one or more modified or alternate versions thereof, in any suitable form that is perceptible to the user (using, for example, text boxes, windows, or other suitable user interface techniques), and may enable the user to directly edit the intermediate search request 122 at that time.

Once the user-specific meaning(s) of the search term(s) of the search request 120 have been determined and/or an intermediate search request 122 is selected (e.g. by the user or automatically by the query developer 112), the query developer 112 formulates a computer-executable query based on the search request 120 or the selected intermediate search request (e.g. intermediate search request 124), as the case may be.

Typically, the computer-executable query includes Boolean operators and may include semantic data that associates semantic types or categories with search terms that appear to include semantic information, such as proper nouns, email addresses, phone numbers, file names, and/or others.

As an example, without any analysis by the query developer 112 using the user-specific model 114, a query based on the illustrated search request 120 might include a string such as: "keyword(john) OR keyword(wakia) OR keyword(rep)." However, with the analysis by the query developer 112, which interprets the search terms to determine user-specific meanings of the search terms and augments the search terms as needed, the query string based on the illustrated search request 120 may include: "name('John Wakia') AND title ('sales representative')," or "name(John) AND document_title(Wakia) AND document_type(report)," or "name (John) AND company(Wakia) and company_division ('phone repair')."

The query executer 116 executes the computer-executable query generated by the query developer 112 to look for the requested information in the search realm 118 or a portion thereof. As indicated by the bidirectional arrows 154, 156, 158, 168, the execution of the query may be an iterative process. For example, in some embodiments, the query executer 116 may execute a query to obtain a set of interim results, interface with the query developer 112 as needed to analyze the interim results using the user-specific model 114, and suggest one or more intermediate search topics 126 to the user based on the analysis of the interim results. Each intermediate search topic 126 may relate to one or more concepts, attributes, characteristics, and/or relationships associated with or shared by or among one or more of the interim results, as determined by the query developer 112 using the user-specific model 114.

In some embodiments, the query executer 116 may present the intermediate search topics 126 to the user for consideration, and wait for the user to select one of the suggested intermediate search topics (e.g. intermediate search topic 128), prior to displaying any query results 130.

In other embodiments, the query executer 116 may present the intermediate search topics 126 to the user at the same time as, or after, the query results 130 are displayed. In these or other embodiments, the query executer 116's interaction with the user may take the form of a natural language dialog with the user, or a structured dialog with the user (using, e.g., pull-down lists, check boxes, or other features of user interface design). In still other embodiments, the query executer 116 may interface with the query developer 112 as needed to automatically (e.g., without user input) analyze the intermediate search topics 126 and select an intermediate search topic (e.g. intermediate search topic 128) for further processing, without displaying the intermediate search topics 126 or prompting the user for a selection. Also, at any time during its analysis, the query developer 112 may output the intermediate search topic 126, and/or one or more modified or alternate versions thereof, in any suitable form that is perceptible to the user (using, for example, text boxes, windows, or other suitable user interface techniques), and may enable the user to directly edit the intermediate search topic 126 at that time.

If an intermediate search topic 126 is selected (e.g. automatically or by the user), the query executer 116 may interface with the query developer 112 to reformulate the computer-executable query based on the selected intermediate search topic (e.g. intermediate search topic 128) and execute the reformulated query against the search realm 118, as may be needed, or may simply display the query results that correspond to the selected topic (e.g. the intermediate search topic 128).

In the illustrated example of FIG. 1, the original search request 120 is "john wakia rep," which includes the search terms: "john," "wakia," and "rep." Accessing the user-specific model 114, the query developer 112 determines that the user knows someone named John Wakia, works with a person named John on a project involving a company named Wakia, and has contact information for a person named John who repairs Wakia phones.

In this example, each of the search terms has multiple possible user-specific meanings. The query developer 112 may interface with the user-specific model 114 and automatically (e.g., without user input) determine that the user is most likely looking for John Jones's reports on Wakia deals. The query developer 112 may arrive at this determination by, for example, analyzing records of the user's most recent electronic interactions (e.g. email messages recently sent or received, calendar entries added or deleted, recent changes in geographic location, etc.), which may be obtained from the user-specific model 114.

However, in the illustrated example, the query developer 112 generates the intermediate search requests 122 based on information obtained from the user-specific model 114. Through an electronic dialog with the query developer 112, the user selects the intermediate search request 124, "John's Wakia report." The query developer 112 formulates a computer-executable query incorporating the information provided by the selected intermediate search request 124, and the query executer 116 executes the query in response to the user's selection of the intermediate search request 124.

Applying the user-specific model 114, the query executer 116 may interface with the query developer 112 to organize or "cluster" the search results generated by the executing of the intermediate search request 124 into the intermediate search topics 126. Here again, the user-specific model 114 may be leveraged to automatically (e.g., without user input) identify which of the intermediate search topics 126 appears to be most applicable to the original search request 120.

However, in the illustrated example, the intermediate search topics 126 are displayed and the user selects the search topic 128, "John Jones's reports on deals with Wakia." The query executer 116 interfaces with the query developer 112 to reformulate the computer-executable query to include the details of the selected intermediate search topic 128. For example, the reformulated computer-executable query may include the following string: "name('John Jones') AND company(Wakia) AND document_summary (deals) AND document_type(report)."

Referring further to FIG. 1, the user-specific model 114 will now be briefly described. In some embodiments, the user-specific model 114 may include one or more of the features described in U.S. patent application Ser. No. 13/149,536, filed May 31, 2011, entitled "Method and Apparatus for User Modelization," which is incorporated herein by this reference in its entirety.

The illustrative user-specific model 114 includes a user-specific profile 132, an electronic content and interaction analyzer module 134, and the personal corpus or body of user-specific content and interactions 136. The electronic content and interaction analyzer 134 includes one or more computer-executable instructions that interface with the user-specific content and interactions 136 to create and update the user-specific profile 132, typically in an automated fashion, e.g., on an continuous, ongoing basis (for example, as a background process).

The personal corpus or user-specific content and interactions 136 generally includes information created by or about the user and/or the user's interactions with electronic content that is accessible to the user through one or more computing devices. Such information and/or interactions may include, for example: data, text, image, audio and video files, presentation slides or files, spreadsheets, electronic messages, email attachments, address book and calendar entries and the like; as well as records of information pertaining to the user's online or local computing activity, query histories, search results; intermediate search requests, web sites visited and/or bookmarked, online or local computer applications or services subscribed to (e.g. RSS feeds, TWITTER follows, automated alert services, etc.), user-specific configuration data or preferences (e.g. travel or dining preferences, music styles, etc.), application-specific user profile information (e.g. employment status or history, subjects or topics of interest, privacy settings, etc.), files, messages, address book entries and/or calendar events created, viewed, opened, modified, sent, forwarded, replied to or deleted, electronic bookmarks, notes, comments, reminders, task lists, and/or others.

As shown in FIG. 1, the personal corpus or body of user-specific content and interactions 136 may be located in private sources 138, shared sources 140, and/or public sources 142. Some examples of private sources 138 include electronic files, folders, and directories, which may be stored on a personal computing device (e.g. a smartphone, personal digital assistant, laptop, tablet, or desktop computer). Some examples of shared sources 140 include electronic messages that are sent to other users (e.g. through an electronic mail or social networking application), and electronic files or other information to which a limited group of other users has access (e.g. via a group folder, intranet, or enterprise system). Some examples of user-specific public sources 142 include blogs, web pages, comments, status updates and Twitter messages created by the user, and/or other interactions of the user with electronic content, to which the user has not restricted access.

Figure 7:
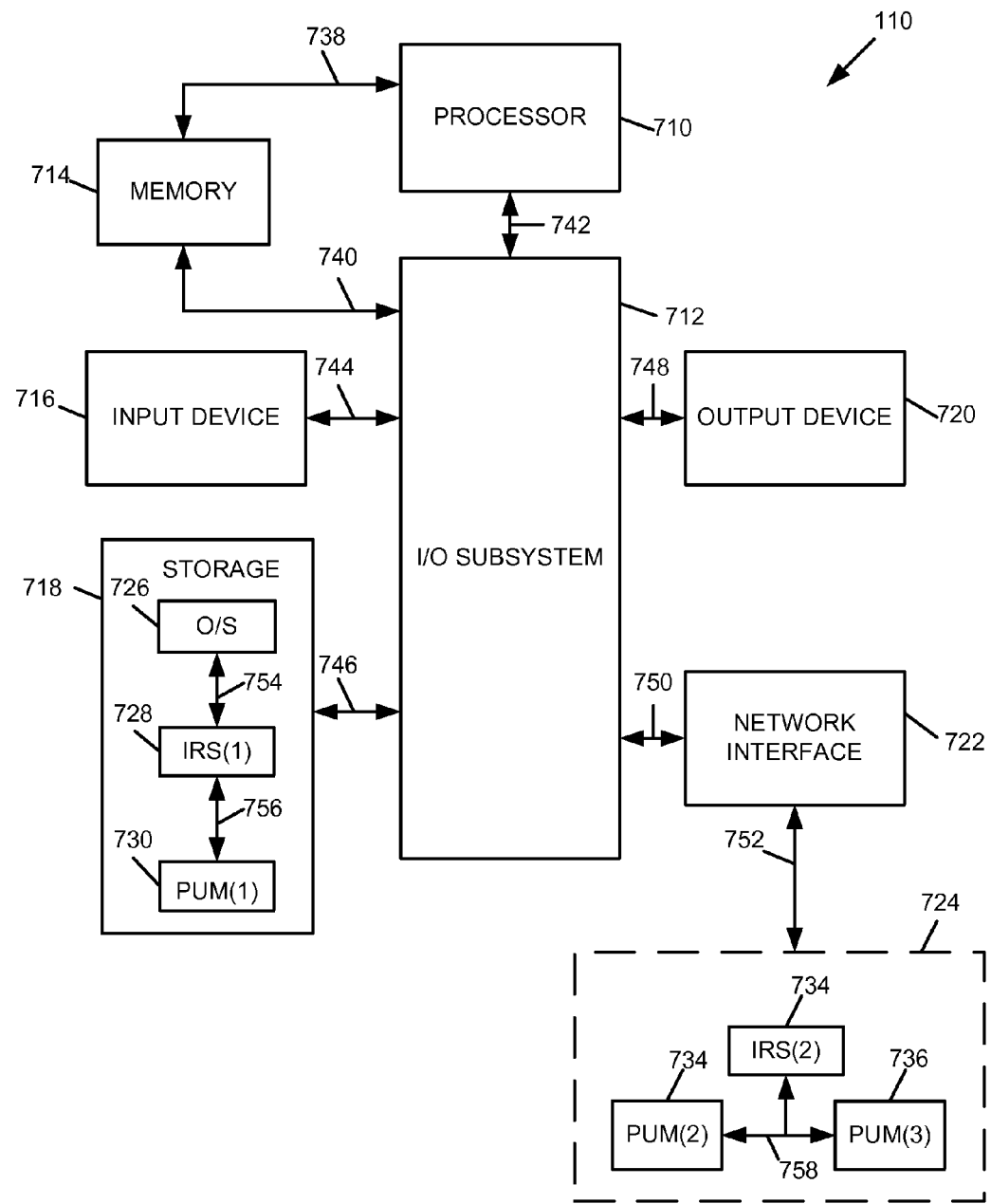
FIG. 7 is a simplified block diagram of a computing environment in connection with which the information retrieval system of FIG. 1 may be implemented.

As illustrated in FIG. 7 and described further below, all or portions of the user-specific content and interactions 136 may be stored on a local computer, a remote computer (e.g. one or more servers or storage devices configured to provide storage for multiple users), an Internet site (e.g. a server hosting a web page or web-based application), and/or other suitable locations depending on the type and/or characteristics of the particular user-specific content and interactions 136.

As the user-specific content and interactions 136 is created, accessed, modified or deleted, the electronic content and interaction analyzer 134 processes and indexes the created, accessed, modified, or deleted user-specific content and interactions 136 to extract, determine, or create keywords, meta tags, summaries, text tokens (which may be associated with non-textual information such as graphics, images, audio and video files, for example), semantic information, source or location information (e.g. folder name, directory, or hyperlink), weights, similarity scores and/or other key information, which the electronic content and interaction analyzer 134 associates with the created or modified user-specific content and interactions 136.

The electronic content and interaction analyzer 134 determines which keywords appear to be the most important, most frequently used, and/or most recently used words in a piece of information or across multiple pieces of information. The electronic content and interaction analyzer 134 also determines semantic information, context information and/or other kinds of information that may be used to identify the piece of information and/or its relationships or associations with other pieces of information in the user-specific content and interactions 136. In some embodiments, the electronic content and interaction analyzer 134 uses one or more statistical or probabilistic analytical tools or techniques, such as a combination of term frequency and inverse document frequency (e.g. a modified tf-idf algorithm), to create and continuously update an index of words that appear to be most important to the user.

The electronic content and interaction analyzer 134 also creates topics and sub-topics, which may include descriptions, connotations, contexts, and/or higher-level concepts or abstractions that represent associations among keywords that appear to have some relationship with one another based on, for example, their use, proximity and/or frequency of occurrence in the user-specific content and interactions 136. The electronic content and interaction analyzer 134 assigns weights to the various keywords, topics, and sub-topics, based on, for example, frequency or recency of use or access by the user. The electronic content and interaction analyzer 134 also analyzes the similarity between various words, topics and sub-topics in the user-specific profile 132, and calculates similarity scores between the various words, topics and sub-topics (using, e.g. a descriptors overlap, content overlap, or other suitable technique to derive a conceptual understanding of the topics based on the associated keywords and/or descriptors).

The user-specific profile 132 is typically embodied as a database or other suitable data structure, and stores the information about the user-specific content and interactions 136 that is generated by the electronic content and interaction analyzer 134 (e.g. keywords, meta tags, topics, sub-topics, indexing information, information about relationships or associations among keywords and/or meta tags, and information about relationships or associations among the various pieces of user-specific content and interactions 136). The user-specific profile 132 also stores the weights that are determined and assigned by the electronic content and interaction analyzer 134 to the various keywords, topics, sub-topics, and other information, and the similarity scores (e.g. Levenshein distances) that are calculated by the electronic content and interaction analyzer 134. The illustrative user-specific profile 132 is described further below, with reference to FIG. 2.

Also shown in FIG. 1 is a typographical error ("typo") identifier module 146, which interfaces with the electronic content and interaction analyzer 134. The description of the typo identifier 146 is related to and therefore follows the description of FIG. 5, below.

As shown by the bidirectional arrows 162, 164, 166, interactions between the electronic content and interaction analyzer 134 and the user-specific profile 132, the user-specific content and interactions 136, and the typo identifier 146 may be iterative in nature. For example, the typo identifier 146 may identify a typographical error or misspelling in a piece of content in the personal corpus or body of user-specific content and interactions 136. The electronic content and interaction analyzer 134 may then update the user-specific profile 132 to include the typographical error or misspelling as an alternative spelling of a keyword stored in the user-specific profile 132, or may update the user-specific content and interactions 136 to include the alternative spelling.

Also, as the user-specific profile 132 is updated, e.g. with new words or associations gleaned from the user's online and/or local computing activity, the electronic content and interaction analyzer 134 may add information to or update the information in the user-specific content and interactions 136. Further, as the user-specific content and interactions 136 is added to or modified, the electronic content and interaction analyzer 134 may update the weights and/or similarity scores associated with keywords, topics and/or sub-topics in the user-specific profile 132 or assign new weights and/or similarity scores to keywords, topics and/or sub-topics in the user-specific profile 132. In these and other ways, the user-specific model 114 continuously learns new information about the user's online and/or local computing activity and personal preferences. As a result, through continuous interfacing with the user-specific model 114, the query developer 112 can adapt and improve its analysis of the user's search requests over time as the user's online and/or local computing activity and/or preferences change.

Figure 2:
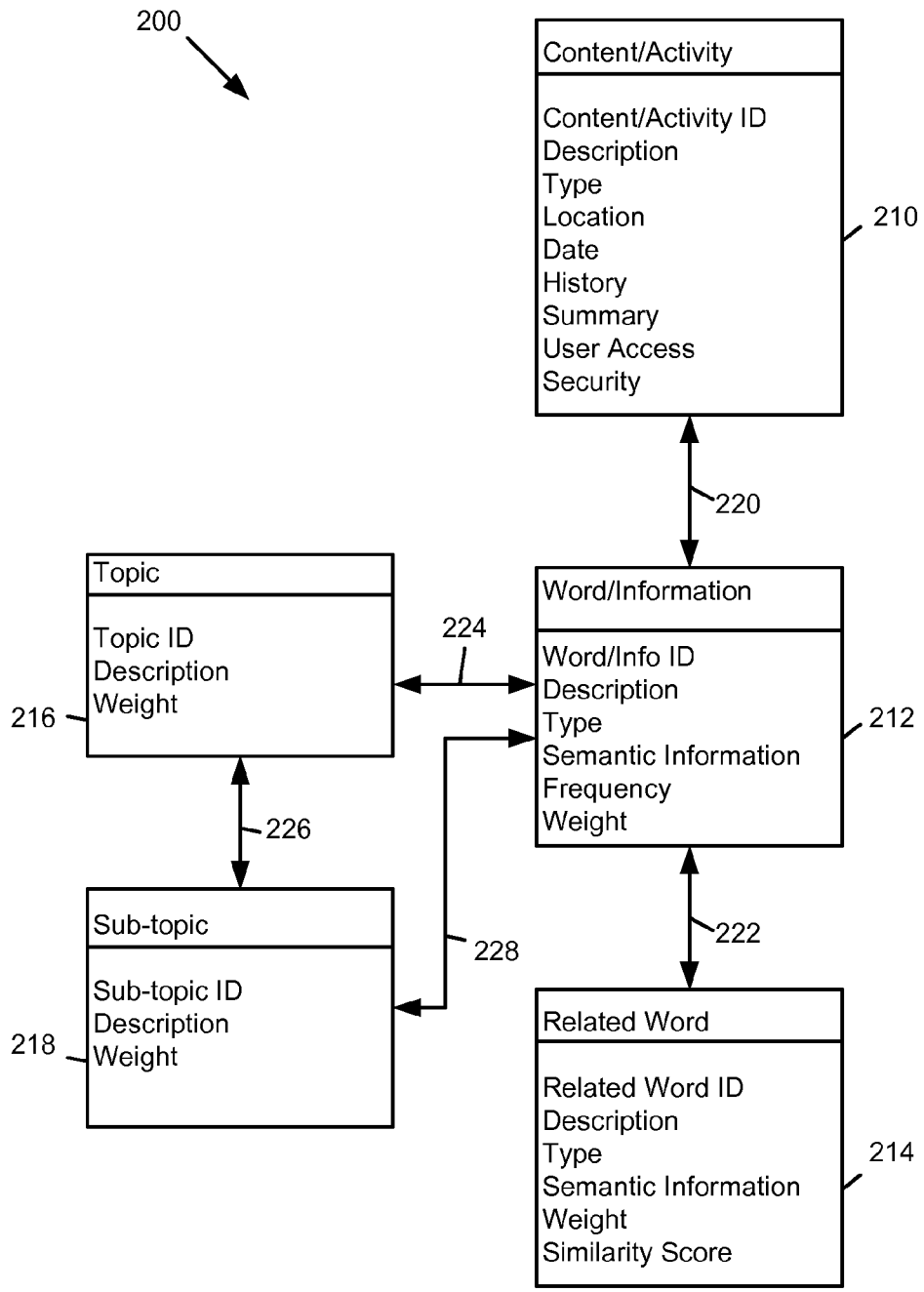
FIG. 2 is a simplified representation of relationships among data that may be used in connection with the information retrieval system of FIG. 1.

Referring now to FIG. 2, an illustrative data model 200 for the user-specific profile 132 is shown. According to the data model 200, the user-specific profile 132 stores and maintains words or information data objects 212 and relationships among the words or information data objects 212 and content or activity data objects 210, related words data objects 214, topics data objects 216, and sub-topics data objects 218.

The words or information data object 212 includes words or information (e.g. keywords, non-word information such as email addresses, account names, or phone numbers, or key phrases) extracted from the various user-specific content and interactions 136. In the illustrative example, a word or information data object 212 may include a keyword, an indicator of the keyword type (e.g. part of speech), semantic information (e.g. a category such as person, place, or thing), frequency information (e.g. how frequently the word or information occurs in a document, group of documents, or in the user-specific content and interactions 136 as a whole), and one or more weights assigned to the word or information 212 by the electronic content and interaction analyzer 134.

As many words can have multiple different user-specific meanings, the words or information data object 212 may include many instances of the same word. For example, as a result of the content and activity analyzer 134's analysis of the user-specific content and interactions 136, the words or information data object 212 may include one instance for "Jan" as the first name of a person and another instance of "Jan" as an abbreviation for the word "January."

Information about the user-specific content and interactions 136 from which the words or information 212 are extracted by the electronic content and interaction analyzer 134 is included in the content or activity data object 210. The content or activity data object 210 includes, in the illustrative example, a description of the content or activity (e.g. the title of a document), a content or activity type (e.g. an indicator of whether the content or activity is a certain type of file), a location (e.g. an indicator of where the content or activity is located, such as a file name, folder name or hyperlink), history information (e.g., the date and/or time the content or activity was created or conducted, last accessed or modified), a summary (e.g. short description of the information contained in a document or other electronic file), and user access and security information (e.g., an indicator of whether the content or activity is available to one or more other users and if so, what actions those users may take with respect to the content or activity, i.e. read, modify, copy, delete, and the like).

The related words data object 214 includes words that are determined by the electronic content and interaction analyzer 134 to be related to words or information data objects 212; for example, abbreviations, acronyms, nicknames, alternative spellings, user-specific shorthand notations, and the like. In the illustrative example, the related words data object 214 includes the related word, an indicator of the type of relationship (e.g. abbreviation, nickname, etc.), semantic information (e.g. a category such as person, place, or thing), a weight determined and assigned to the related word by the electronic content and interaction analyzer 134; and a similarity score, calculated by the electronic content and interaction analyzer 134, which indicates a degree of similarity of the related word with a word or information 212 to which the related word 214 is linked.

The topic data object 216 and the sub-topic data object 218 each include words that describe or indicate higher-level concepts and/or user-specific associations or relationships among the words or information data objects 212, as determined by the electronic content and interaction analyzer 134. For example, based on its analysis of the user-specific content and interactions 136, the electronic content and interaction analyzer 134 may associate the keywords "phone" and "John" with a topic called "deals" and also with a sub-topic of the "deals" topic called "Europe."

The bidirectional arrows 220, 222, 224, 226, 228 are used to indicate that in the illustrative embodiment, many-to-many relationships can exist between the data objects 210, 212, 214, 216, 218. For example, a word 212 may be contained in or associated with one or a number of different pieces of content or activity 210, related words 214, topics 216, and/or sub-topics 218. Similarly, a piece of content or activity 210 may include or be associated with many different words or information 212; a related word 214 may be related to many different words or information 212; and a topic 216 or sub-topic 218 may be associated with many different words or information 212. Also, a topic 216 may have multiple sub-topics 218 associated with it, and a sub-topic 218 may be associated with multiple topics 216. To continue the above example, the sub-topic "Europe" may be associated with a topic called "trips" in addition to being associated with the "deals" topic.

Referring now to FIG. 3, an illustrative method 300 executable by the query developer 112 includes a query interpreter sub-module 310, a query corrector sub-module 312, and a query augmenter sub-module 314. Utilizing the user-specific model 114 and, optionally, one or more other resources, the query interpreter 310 determines the user-specific meaning(s) of individual search terms in the search request 120 (if any), which may include relationships between or among one or more of the individual search terms in the search request 120 and/or associations of a search term or terms with one or more terms, words, related words, concepts, topics, and/or sub-topics stored in the user-specific profile 132. An illustrative method 400 executable by the query interpreter 310 is described below with reference to FIG. 4.

The query corrector sub-module 312 analyzes output of the query interpreter 310 to identify unknown words (e.g. misspelled words or typographical errors) and, using the user-specific model 114, tries to identify known words that correspond to the unknown words. An illustrative method 500 executable by the query corrector 312 is described below with reference to FIG. 5.

The query augmenter sub-module 314 analyzes output generated by the query interpreter 310 and/or output generated by the query corrector 312. The query augmenter 314 looks for additional search terms that, according to the user-specific model 114, may be related to one or more of the search terms in the search request 120, but that were not part of the original search request 120. The query augmenter 314 then adds, or suggests that the user add, one or more of the additional search terms to the search request 120 and/or a corresponding computer-executable query. An illustrative method 600 executable by the query augmenter 314 is described below with reference to FIG. 6.

Referring now to FIG. 4, the illustrative method 400 executable by the query interpreter 310 is shown. Initially, the query interpreter 310 determines whether the search request 120 is in voice or text form. If the search request 120 is in voice form, then a voice-to-text processor (which may be of a conventional type or a type developed after the date of this disclosure) is used to convert the search request 120 to text form. The type of search request (e.g. whether it is a keyword or natural language search request) is also determined.

The search request 120 is divided into its individual components at block 410. If the search request 120 is a keyword search request, then the individual search terms are identified, where a search term may include a single word, combination of letters and/or numbers, or a grouping of words in the search request 120.

If the search request 120 is a natural language search request, natural language parsing is performed using a natural language processor 416 (which may be of a conventional type or a type developed after the date of this disclosure). In some embodiments, for example, open source software such as the General Architecture for Text Engineering (GATE), may be used as the natural language processor 416.

It should be appreciated by those skilled in the art that natural language processing may create "tokens," each of which may include an entire word of a search term, a group of words, or sub-components of words. For ease of discussion, "search term" is used herein to refer, individually or collectively, to search terms of a keyword search request and/or tokens of a natural language search request. Also, the term "word" as used herein encompasses words as well as combinations of letters and/or numbers that may not be found in public dictionaries, such as acronyms, nicknames, user-specific abbreviations, misspelled words, and the like.

Referring still to block 410, a semantic processor 418 divides keyword search requests into search terms. For example, the semantic processor 418 may determine that "john" and "wakia" are proper nouns, that "john" refers to a person, and that since the terms "john" and "wakia" are adjacent to one another in the illustrative search request 120, they should be grouped together, so that the intended search request should include "keyword('john wakia')" (e.g. first and last name), rather than "keyword(john) OR keyword (wakia)."

At block 412, the search terms of the search request 120 are analyzed, using any or all of the analyzer modules 420, 422, 424, 426, 428, each of which is configured to use the user-specific model 114 to conduct its analysis. Based on one or more of these analyses, the query interpreter 310 may annotate the search request 120 with information relating to the meaning of one or more of the search terms, and more particularly, with information relating to a user-specific meaning, if a user-specific meaning is determined.

The topic analyzer 420 looks for words 212, topics 216 and/or sub-topics 218 in the user-specific profile 132 that are associated with one or a combination of the search terms of the search request 120. For example, the topic analyzer 420 may determine, from the user-specific profile 132, that the search term "john" is associated with the topic "wakia" and the topic "reports," and that the search term "wakia" is associated with the topic "reports." As a result, the topic analyzer 420 may annotate the search request 120 to associate the term "reports" with the search term, "rep."

The heat map analyzer 422 accesses a heat map that is created and maintained by the electronic content and interaction analyzer 134 and which may be stored in the user-specific profile 132. The heat map may be created as follows. As part of its ongoing processing, the electronic content and interaction analyzer 134 reviews the weights that are determined and assigned to the different words 212, topics 216 and sub-topics 218, and stored in the user-specific profile 132. The electronic content and interaction analyzer 134 analyzes the weights and/or the recency and/or frequency of use of the words 212, topics 216 and sub-topics 218, and/or other information obtained from the user-specific profile 132. The electronic content and interaction analyzer 134 may then determine which of the words 212, topics 216 and sub-topics 218 appear to be most important to the user at a particular moment in time and associate them with a heat map. In other words, a heat map identifies words 212, topics 216 and/or sub-topics 218 that appear to be of particular interest to the user at a particular point in time.

The heat map analyzer 422 accesses the heat map to see if any of the search terms of the search request 120 are associated with any words 212, topics 216 or sub-topics 218 that are in the heat map or that have been identified by the heat map as being of particular interest to the user. For example, if the electronic content and interaction analyzer 134 determines that the user has exchanged several email messages with a John about repairing a Wakia phone, the terms "john," "wakia," and "phone" may be assigned to the heat map by the electronic content and interaction analyzer 134. The heat map analyzer 422 may determine from the heat map that the search terms "john" and "wakia" are associated with a topic called "email messages," and that the term "phone" appears to be of particular interest to the user. Thus, the heat map analyzer 422 may annotate the search request 120 to look specifically for email messages (as opposed to other types of documents or information) having a sender or recipient named John and the keywords "wakia" or "phone" in the subject or body of the message.

The semantic analyzer 424 accesses the user-specific model 114 to determine semantic information that may be appropriate to associate with a search term. For example, if a search request 120 contains the search term 'jan," the semantic analyzer 424 may determine from the user-specific profile 132 that the user works with a person named Jan, and that the word or information data object 212 for the person named Jan is highly weighted. Therefore, the semantic analyzer 424 may annotate the search request 120 to indicate that "jan" is a person and not part of a date (i.e., an abbreviation for the month of January).

The context analyzer 426 accesses the user-specific model 114 to obtain information about the user's current context, e.g. the person's current location, the date and time, recent changes in calendar or contact information, recent email activity, and/or other information, which may be related to one or more of the search terms in the search request 120. For example, from the user-specific profile 132, the context analyzer 426 may determine that user's title has recently changed from "VP, Europe Operations" to "VP, US Operations," or that the user has recently relocated from Europe to the United States. As a result, the context analyzer 426 may annotate the search request 120 to limit the scope of the searching to persons who work at the user's United States office, and thereby avoid unnecessarily searching for information about Johns who work at the user's European office.

The query history analyzer 428 accesses the user-specific model 114 to look for search requests that the user has submitted in the past. The query history analyzer 428 may also look for information relating to the number of times the user has submitted a particular search request and/or the user's online and/or local computing activity in response to the search results (e.g., whether the user selected any of the search results, and if so, which results were selected) of previously-executed queries.

For example, given the example search request 120, "john wakia rep," the user may be looking for contact information for a Wakia repair person, but cannot remember the person's first name. The query history stored in the user-specific profile 132 may reveal that the user had earlier searched for "jim wakia rep" but that the search did not return any results, and then searched for "phone repair," but that search returned too many results and the user did not view any of the results. From the user-specific query history, the query history analyzer 428 may determine that the user is looking for someone to repair a Wakia phone and annotate the search request 120 to delete the term, "john," associate the term "wakia" with a company name, and associate the term "repair" with the search term, "rep."

The query interpreter 310 may repeat all or portions of the above-described method 400 for each search term of the search request 120.

Figure 5:
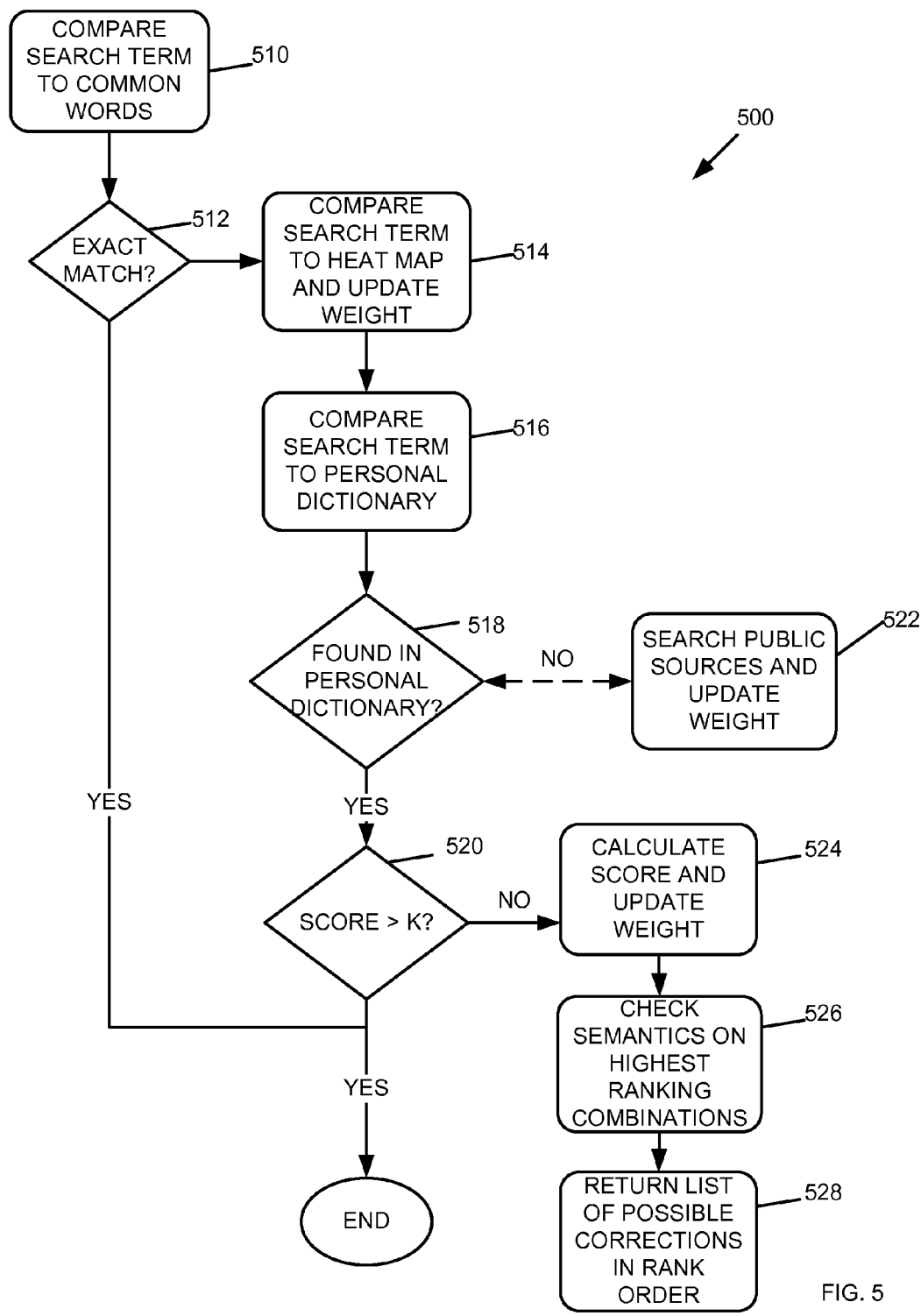
FIG. 5 is a simplified flow diagram for a method of correcting a search term.

Referring now to FIG. 5, the illustrative method 500 executable by the query corrector 312 is shown. The query corrector 312 analyzes each search term (e.g. word or token) of the search request 120, as identified and interpreted by the query interpreter 310. At block 510, the query corrector 312 receives a search term of a search request 120 and compares the search term to a set of common natural language keywords. The set of common natural language keywords may include, for example, prepositions such as "from," "to," "about," articles such as "a," an," "the," and/or conjunctions such as "and," "or," etc., which are stored in the user-specific profile 132 and/or a public dictionary included in the non-user specific content and activity 144.

At block 512, the query corrector 312 determines whether the search term exactly matches one of the common natural language keywords. If there is an exact match, then no correction is needed and the method 500 proceeds to block 530.

If there is not an exact match, then the query corrector 312 determines a set of possible matching terms from the set of common natural language keywords, and assigns weights to the possible matching terms, based on the degree of similarity of the possible matching term with the search term (e.g. the calculated similarity score). Higher weights are assigned to possible matching terms from the set of common natural language keywords that are determined to be closer in similarity to the search term of the search request 120 being analyzed. The query corrector 312 may update the user-specific profile 132 to associate the possible matching terms from the set of common natural language keywords with the search term of the search request 120.

At block 514, the query corrector 312 compares the search term to a set of possible matching terms obtained by the query corrector 312 from the heat map. As described above in connection with FIG. 4, the electronic content and interaction analyzer 134 generates the heat map from the user-specific profile 132. The heat map includes words 212, related words 214, topics 216, and/or sub-topics 218 that, through analysis by the electronic content and interaction analyzer 134, appear to be of particular interest or importance to the user at a particular time, due to the user's recent query history or other information from the user-specific model 114. The query corrector 312 assigns higher weights to possible matching terms from the heat map that are determined to be closer in similarity to the search term. The query corrector 312 may update the user-specific profile 132 to associate the possible matching terms from the heat map with the search term of the search request 120.

At block 516, the query corrector 312 compares the search term to words stored in the user's user-specific profile 132. At block 518, the query corrector 312 determines whether the search term is stored in the user-specific profile 132. If the search term is not found in the user-specific profile 132 then, optionally, the search term may be compared to one or more public sources such as publicly available knowledge bases or dictionaries, at block 522. The query corrector 312 assigns lower weights to possible matching terms from the public sources that are determined to be closer in similarity to the search term of the search request 120. The query corrector 312 may update the user-specific profile 132 to associate the possible matching terms from the public sources with the search term of the search request 120.

If the query corrector 312 finds a possible match for the search term in the user-specific profile 132, then at block 520, the query corrector 312 calculates a similarity score (e.g. a score computed using a standard Levenshein Distance calculation) for the possible match and the search term, and determines whether the similarity score is greater than a predefined threshold value, K. If the possible matching word from the user-specific profile 132 has a similarity score that is greater than K, then it is considered a match and the method 500 proceeds to block 530. The query corrector 312 may update the user-specific profile 132 to associate the search term with the matching term from the user-specific profile 132 having a similarity score greater than K.

If the possible matching term from the user-specific profile 132 does not have a similarity score greater than K, then at block 524 the query corrector 312 updates the weight associated with the possible match according to the possible matching term's similarity score. Moderate weights are assigned to possible matching terms from the user-specific profile 132 that have a similarity score less than or equal to K. The user-specific profile 132 may be updated to associate the search term with the matching term from the user-specific profile 132 having a similarity score less than or equal to K, and the updated weight.

At block 530, the method 500 checks to see if the search request 120 contains additional search terms that need to be processed by the query corrector 312. If additional search terms need to be processed, then the method 500 returns to block 510. If there are no additional search terms that need to be processed, the method 500 proceeds to block 526.

At block 526, the query corrector 312 creates a matrix, list, table, or similar arrangement of all possible combinations of the search terms and the possible matching terms obtained from the various sources, and their associated weights, and sorts the combinations by weight from highest to lowest. The N highest ranking combinations are analyzed by the natural language processor 416 and the semantic processor 418 to determine whether they are semantically correct. Any combinations that are not determined to be semantically correct are discarded.

The query corrector 312 incorporates the remaining M combinations (where M may be less than or equal to N) into intermediate search requests 122, which are compared to the original search request 120, converted into computer-executable queries, and executed against the search realm 118 or a portion thereof. Optionally, the query corrector 312 may compare the M combinations to one or more similar queries from the user's query history stored in the user-specific profile 132, and based on that comparison, a query from the user's query history may be used. If any query containing an M combination returns no results, then that M combination is discarded. The remaining V combinations (where V is less than or equal to M) are returned, sorted by weight, at block 528.

The query corrector 312 may then select one or more of the V combinations and update the user-specific profile 132 to associate the selected V combination(s) with the search term of the search request 120. Alternatively or in addition, the user may be prompted to select one of the V combinations to be associated with the search term. It should be appreciated by those skilled in the art that the parameters K, M, N, and V, as well as other parameters and weights used by the method 500, may be determined and configured according to the particular characteristics of the user-specific profile 132, the particular requirements or design of a specific embodiment of the information retrieval system 100, and/or other factors. Further, some or all of these parameters and/or weights can be "learned," or changed over time as the user-specific profile 132 is developed, updated or changed.

The query corrector 312 repeats the above-described method, or portions thereof, for each search term in the search request 120. Once the query corrector 312 has processed of all of the search terms of the search request 120, an updated computer-executable query is created, which may include one or more of the combinations generated by the query corrector 312 at block 526. The updated computer-executable query and/or an association of the updated computer-executable query with the search request 120, may be stored in the user-specific profile 132. In addition, the query corrector 312 may add or update weights associated with words 212, topics 216 and/or subtopics 218 in the user-specific profile 132 in response to the processing of the search request 120.

Referring back to FIG. 1, whereas the query corrector 312 corrects errors in the search request 120, the typo identifier 146 interfaces with the electronic content and interaction analyzer 134 to identify and correct errors (e.g. typographical errors and/or misspellings) in the personal corpus or body of user-specific content and interactions 136. As a result, for example, user-specific content and interactions 136 can be found by a search request 120 even if a search term of the search request 120 is correctly spelled in the search request 120 but incorrectly spelled in the user-specific content and interactions 136.

The illustrative typo identifier 146 is a continuously running (e.g. background) process that reviews and compares the words, topics and sub-topics stored in the user-specific profile 132 to one another. The typo identifier 146 identifies combinations of terms in the user-specific profile 132 that are very close matches (as determined by a small similarity score, e.g., a small Levenshein distance), and have a large difference in the frequency of use (i.e. one term is used frequently while the other term is not as common).

For terms that meet these criteria, the typo identifier 146 generates a computer-executable query and executes it against the search realm 118 or a portion thereof (e.g. the personal corpus or body of user-specific content and interactions 136). A sample set of search results is then used for further analysis. Terms matching the terms pulled from the user-specific profile 132, as well as similar terms having a similarity score within a defined range or window X, are extracted from the search results. Unique terms in the spatial vicinity of each such term are also extracted, such that a "bag of words" is created for each term. A similarity score (e.g. Levenshein score) is calculated for each word in the bag of words for each term.

If a word's similarity score is greater than a determined threshold Y, then the word's frequency of occurrence is evaluated. If a word has a low frequency and a similarity score greater than Y, then that word may be determined to be a typographical error or misspelling of the term that has the highest frequency and a similarity score greater than Y. The user-specific content and interactions 136 is then searched for occurrences of the word determined to be a typographical error or misspelling, and any user-specific content and interactions 136 containing the term is updated to include the 'corrected' term as a tag (e.g. meta data).

Once the user-specific content and interactions 136 has been updated with the corrected tag, the electronic content and interaction analyzer 134 recomputes the frequency taking into account all known spellings of the corrected word, and then recalculates the associated weights (e.g. tf-idf scores) for the user-specific content and interactions 136 based on the recomputed frequency.

The typo identifier 146 may repeat all or portions of the above-described method for each word 212, topic 216 and/or sub-topic 218 in the user-specific profile 132. It should be appreciated by those skilled in the art that the parameters X and Y are determined and configured according to the particular characteristics of the user-specific profile 132, the particular requirements or design of a specific embodiment of the electronic content and interaction analyzer 134, and/or other factors.

It should be understood by those skilled in the art that while the electronic content and interaction analyzer 134 and the typo identifier 146 have been described herein as continuously running processes, each or either of such processes may be scheduled, initiated by a user, or triggered by the occurrence of an event, in other embodiments.

Figure 6:
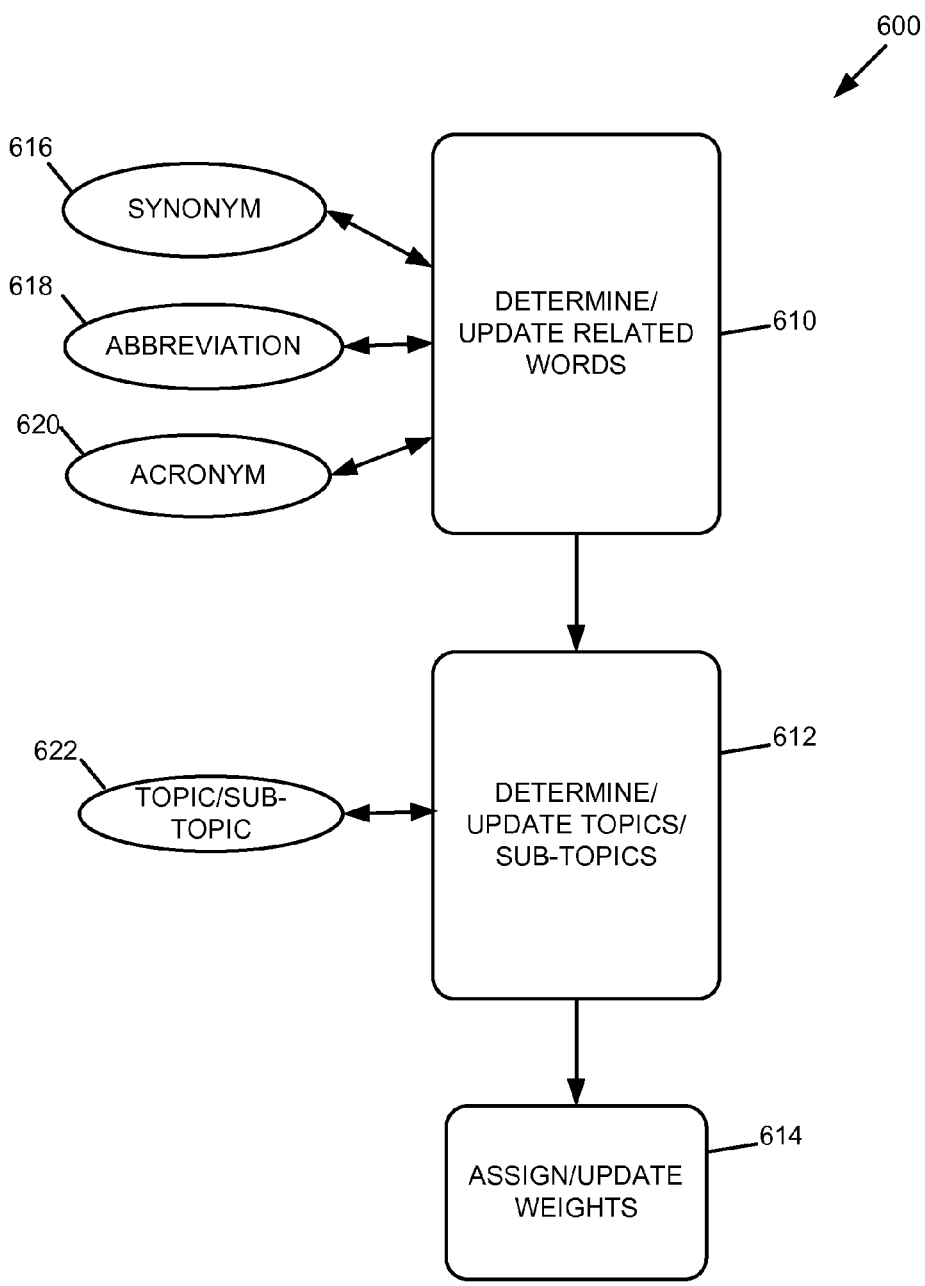
FIG. 6 is a simplified flow diagram for a method of augmenting a search request.

Referring now to FIG. 6, the illustrative method 600 executable by the query augmenter 314 is shown. As mentioned above, the query augmenter 314 is configured to supplement the search request 120 with additional search terms that are identified by the query developer 112, using the user-specific model 114, as having a user-specific relationship or association with one or more of the original search terms of the search request 120. In some instances, the additional search terms may broaden the original search request 120 while in others, the additional search terms may narrow or simply clarify the original search request 120.

At block 610, the query augmenter 314 analyzes the search terms of the search request 120, using any or all of the analyzer modules 616, 618, 620, each of which is configured to apply the user-specific model 114 to its analysis. Based on one or more of these analyses, the query augmenter 314 may identify one or more related words 214 for inclusion in the search request 120, an intermediate search request 122, an intermediate search topic 126, or a computer-executable query corresponding to any or all of the foregoing, as the case may be.

The synonym analyzer 616 determines whether a search term of the search request 120 is a proper noun. If the search term is not a proper noun, the synonym analyzer 616 accesses one or more publicly available sources, such as public dictionaries and/or thesauruses, in the non-user specific content and activity 144, to look for one or more synonyms for the search term. If the search term is a proper noun, the synonym analyzer 616 accesses the user's user-specific profile 132 to look for possible synonyms.

For example, the synonym analyzer 616 may determine, from the user-specific profile 132, that the user has contact information for a person named John Wakia. Also, through analysis of the user-specific content and interactions 136, the electronic content and interaction analyzer 134 may have previously determined that the user has sent email messages to a John Wakia in which the user typed the word "Jack" at the beginning of the body of the message, and thus updated the user-specific profile 132 to associate the nickname "Jack" with the "John Wakia" information. As a result, the synonym analyzer 616 may update the search request 120 to include "Jack" as a search term, e.g., "(John OR Jack) AND Wakia."

The synonym analyzer 616 may repeat all or portions of the above-described method for each search term of the search request 120. If the synonym analyzer 616 identifies a synonym for the search term, the query augmenter 314 may create an intermediate search request 122 including the synonym, or simply include the synonym in the computer-executable query corresponding to the search request 120. The query augmenter 314 may also update the user-specific profile 132 to include an association between the search term and the synonym.

The abbreviation analyzer 618 accesses the words 212 and related words 214 data in the user's user-specific profile 132 to determine whether there is a user-specific abbreviation for the search term. The abbreviation analyzer 618 uses an abbreviation-pattern matching algorithm (which may be of a conventional type or developed after the date of this disclosure) to identify terms in the user-specific profile 132 that may be an abbreviated form or long form of the search term.

If a possible match is found, the abbreviation analyzer 618 looks to see if the search term and the possible match occur together in similar content or activity in the user specific content and activity 136. The possible match may be assigned a higher weight if the abbreviation analyzer 618 determines that the possible match and the search term co-occur in similar documents.

Using the example shown in FIG. 1, the abbreviation analyzer 618 may determine that the terms "representative" and "rep" are present in the same user-created document or in multiple similar documents (e.g. email messages addressed to the user's Vice President of Sales in which the name John Wakia is also mentioned), that are indexed in the user-specific profile 132. As a result, the abbreviation analyzer 618 may update the search request 120 to not only include the term "representative" as an alternative form of "rep," but, alternatively or in addition, to add the term "sales representative" as a search term.

The abbreviation analyzer 618 may repeat all or portions of the above-described method for each search term of the search request 120. If the abbreviation analyzer 618 identifies an abbreviation for or long form of the search term (as the case may be), the query augmenter 314 may create an intermediate search request 122 including the abbreviation or long form of the search term, or simply include the abbreviation or long form in the computer-executable query corresponding to the search request 120. The query augmenter 314 may also update the user-specific profile 132 to add an association between the search term and the abbreviation or long form of the search term.

The acronym analyzer 620 accesses publicly available sources, such as public knowledge bases in the non-user specific content and activity 144, as well as the user-specific profile 132, to determine whether a search term of a search request 120 may relate to a user-specific acronym. If so, the acronym analyzer 620 determines a most appropriate definition for the acronym in view of the user's search request 120 and the information obtained from the user-specific profile 132.

The acronym analyzer 620 uses an acronym-pattern matching algorithm (which may be conventional or developed after the date of this disclosure) to identify terms in the user-specific profile 132 that may correspond to the search term. The acronym analyzer 620 may also look to see if the search term and the possible match occur together in similar content or activity in the user-specific content and interactions 136. The possible match may be assigned a higher weight if the acronym analyzer 620 determines that it and the search term co-occur in a document, in a group of documents, or in close proximity to one another within a document, in the user-specific model 114.

For example, if a search request 120 includes the single term, "nfl," the acronym analyzer 620 may obtain the term, "NATIONAL FOOTBALL LEAGUE" from the non-user specific content and activity 144 but also determine that "nfl" is associated with the term, "New Feature Laboratory," in the user's user-specific profile 132. Previously, the electronic content and interaction analyzer 134 may have assigned a higher weight to the term "New Feature Laboratory" in the user-specific profile 132, based on, for example, the number and/or frequency of occurrences of the term in documents recently created by the user. As a result, the acronym analyzer 620 may update the search request 120 to include the term "New Feature Laboratory," rather than "NATIONAL FOOTBALL LEAGUE," as a long form of "nfl."

The acronym analyzer 620 may repeat all or portions of the above-described method for each search term of the search request 120. If the acronym analyzer 620 identifies an acronym for or long form of the search term, the query augmenter 314 may create an intermediate search request 122 including the acronym or long form of the search term, or simply include the acronym or long form in the computer-executable query corresponding to the search request 120. The query augmenter 314 may also update the user-specific profile 132 to add an association between the search term and the acronym or long form of the search term.

At block 612, the query augmenter 314 accesses the user-specific model 114 to determine whether there are any topics 216 or sub-topics 218 that appear to be related to the search term of the search request 120. If a related topic 216 or sub-topic 218 is found, the topic and sub-topic analyzer 622 may identify words 212 or related words 214 that appear to be related to the search term via the topic 216 and/or sub-topic 218, as the case may be.

The topic and sub-topic analyzer 622 also analyzes the strength of the association between the search term and the identified word 212, topic 216, and/or sub-topic 218. The topic and sub-topic analyzer 622 determines, for example, the probability of a strong correlation, using information gleaned from the user-specific profile 132 such as the number of times the term and the word 212, topic 216, and/or sub-topic 218 appear together in the user-specific content and interactions 136.

For example, if a search request 120 contains the term, "wakia," the topic and sub-topic analyzer 622 may determine from the user-specific profile 132 that the term "wakia" is associated with a topic 216 called "phone manufacturer." The topic and sub-topic analyzer 622 may further determine from the user-specific profile 132 that the names of other phone manufacturing companies are also associated with the "phone manufacturer" topic 216. As a result, the topic and sub-topic analyzer 622 may update the search request 120 to include as search terms the names of other phone manufacturing companies or to include, more generally, the search term, "phone manufacturer" in addition to the term, "wakia," in the search request 120.

The topic analyzer and sub-topic analyzer 622 may repeat all or portions of the above-described method for each search term of the search request 120. The query augmenter 314 may create one or more intermediate search requests 122 including the words and/or related words 212, 214, topics 216 and/or sub-topics 218, that are found by the topic and sub-topic analyzer 622, or may simply generate a computer-executable query based on the original search request 120 and including the words and/or related words 212, 214, topics 216 and/or sub-topics 218, that have been found by the topic and sub-topic analyzer 622.

At block 614, the query augmenter 314 may assign weights, or update the weights previously assigned, to the search terms of the search request 120, based on the perceived strength of the association between the search term and the words and/or related words 212, 214, topics 216 and/or sub-topics 218 found by the topic and sub-topic analyzer 622. The query augmenter 314 may compute the measure of perceived strength of association (e.g., the confidence level or strength of belief that the terms are related) using statistical measures including probabilities, proximity measures, and/or other techniques.

The query augmenter 314 can be configured to supplement the original search request 120 in a number of different ways, including: automatically completing the search request 120 with additional terms as the user is entering the search request 120 (e.g. as the user is typing a search term); presenting intermediate search requests 122 and/or intermediate search topics 126 to the user for selection; automatically (e.g. without user input) selecting an intermediate search request 122 or intermediate search topic 126; and/or by offering suggested queries to the user before the user enters a search request. Further, in embodiments where multiple intermediate search requests 122 or suggested queries are offered to the user, the suggested search requests or queries may be grouped or "clustered" based on the search terms and/or associations of the search terms with words, topics, sub-topics and/or other information in the user-specific profile 132, as may be determined by the query developer 112. Once grouped or clustered, the presentation of the suggested search terms or queries may be organized or arranged according to the user's relative interest in the groups or clusters as determined from the user-specific profile 132.

For example, if the user has submitted two different search requests 120 that have returned no results, the query augmenter 314 may suggest a new search request based on associations between or among one or more of the search terms of the first two search requests, which are gleaned from the user-specific model 114.

As another example, the query augmenter 314 may offer suggested search requests to the user based on the user's search history and patterns in the times in which the user has submitted search requests. For instance, if the electronic content and interaction analyzer 134 determines that the user has repeatedly submitted the same search request at about the same time every month, the query augmenter 314 may suggest the same search request to the user when that time arrives in the next month.

Further, if the electronic content and interaction analyzer 134 determines that the user has added a meeting to his or her electronic calendar, the query augmenter 314 may suggest a search request relating to information the user may need for the meeting. As well, the query augmenter 314 may interface with the query executer 116 to automatically generate and execute computer-executable queries corresponding to the suggested search requests. In some embodiments, the computer executable queries may be pre-executed in anticipation of the entry of a search request 120 by the user, in order to provide a faster response if the user does enter the search request, or for other reasons.

Referring now to FIG. 7, an illustrative embodiment of the computing device 110 is shown. The computing device 110 includes at least one processor 710 and an input/output (I/O) subsystem 712. In the illustrative embodiment, the computing device 110 is embodied as a personal computing device such as, for example, a mobile or handheld computing device, smartphone, personal digital assistant, laptop computer, tablet computer, or desktop computer. However, the computing device 110 may be embodied as any type of computing device such as, for example, a server, an enterprise computer system, a network of computers, or other electronic device.

The processor 710 includes one or more processor cores (e.g. microprocessors). The I/O subsystem 712 typically includes, among other things, an I/O controller, a memory controller, and one or more I/O ports (not shown). The processor 710 and the I/O subsystem 712 are communicatively coupled to a memory 714. The memory 714 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The I/O subsystem 712 is communicatively coupled to at least one input device 716, at least one data storage 718, at least one output device 720, and at least one network interface 722. The I/O subsystem 712 may be communicatively coupled to one or more other peripheral devices such as a graphics, sound and/or video adapter (not shown), depending upon, for example, the intended use of the computing device 110.

The input device 716 may include a keyboard, keypad, touch screen, microphone, or other suitable device for accepting input (e.g. search requests 120) from a user. The output device 720 may include a text, graphics, and/or video display screen, speaker, or other suitable device for presenting output (e.g. intermediate search requests 122, intermediate search topics 126, search results 130, etc.), to the user.

The network interface 722 communicatively couples the computing device 110 to one or more networks 724, which may include a local area network, wide area network, personal cloud, enterprise cloud, public cloud, and/or the Internet. Accordingly, the network interface 724 may include a wired or wireless Ethernet adapter, Wi-Fi adapter or other suitable device as may be needed, pursuant to the specifications and/or design of the particular network 724.

The data storage 718 may include one or more hard drives or other suitable data storage devices (e.g., memory cards, memory sticks, and/or others). In the illustrative embodiment, an operating system (O/S) 726 resides in the data storage 718. The operating system 726 is, for example, a Microsoft Windows®, Linux, or other operating system, or other similar set of instructions, which may be designed specifically for a particular type of computing device, for example, a discrete, handheld, or portable electronic device or smartphone.

Either or each of the information retrieval system 100 and the user-specific model 114 may be local to the computing device 110 or distributed across multiple computing devices 110. In the illustrated example, the information retrieval system IRS(1) 728 includes one instance of the information retrieval system 100 and the user-specific or "personal" user model PUM(1) 730 includes one instance of the user-specific model 114. At least a portion of each of the IRS(1) 728 and the PUM(1) 730 is stored in the data storage 718. Portions of the O/S 726, IRS(1) 728, and/or PUM(1) 730 may be copied to the memory 714 during operation, for faster processing or other reasons.

In some embodiments, the IRS(1) 728 may include a client application or front-end user interface for the information retrieval system 100, while a back end or server application for the information retrieval system 100 may reside on the network 724 (e.g. as an information retrieval system IRS(2) 734). Likewise, the PUM(1) 730 may include aspects of the user-specific model 114 that are local to the computing device 110, such as locally created documents; while other aspects of the user-specific model 114, such as records of the user's electronic interactions with networked systems, may reside on the network 724 (e.g. as a user-specific or personal user model PUM(2) 734).

In some embodiments, the entire information retrieval system 100 and the entire user-specific model 114 may be stored in the data storage 718 (e.g. as IRS(1) 728 and user-specific or personal user model PUM(1) 730) of the computing device 110.

In some embodiments, the IRS(1) 728 and/or the IRS(2) 734 may have access to all or portions of one or more other users' user-specific or personal user models (e.g. one or more user-specific or personal user models PUM(3) 736). In this way, the information retrieval system 100 can leverage not only user-specific information that is contained in the user's own user-specific or personal user model (e.g. PUM (1) 730), but also user-specific information contained in other user-specific or personal user models to which it has been granted access (e.g. by family, friends or colleagues of the user). Similarly, another instance of the information retrieval system 100 (such as an instance of an information retrieval application used by family, friends, or colleagues of the user) may have access to all or portions of the user's user-specific or personal user model(s) PUM(1) 730 and/or PUM(2) 734, as may be granted by the user.

The computing device 110 may include other components, sub-components, and devices not illustrated in FIG. 7 for clarity of the description. Further, it should be appreciated that in embodiments where one or more of the instances of information retrieval systems 728, 734 and/or user-specific or personal user models 730, 734, 736 are distributed or implemented on a network, such systems should be capable of tracking and maintaining the identify of the user(s) associated with the respective user-specific or personal user models 730, 734, 736. This can be done, for example, via a logon ID and password, device address (such as an IP address), or other suitable identifying information and/or techniques.

In general, the components of the computing device 110 are communicatively coupled as shown in FIG. 7, by one or more signal paths, which are represented schematically as bidirectional arrows 738, 740, 742, 744, 746, 748, 750, 752, 754, 756, 758. Such signal paths may be embodied as any type of wired or wireless signal paths capable of facilitating communication between the respective devices. For example, the signal paths may be embodied as any number of wires, printed circuit board traces, busses, point-to-point interconnects, intervening devices, and/or others.

While the invention has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of an information retrieval system, it will be understood that the various aspects have other applications, for example, any application in which it is desired to have access to a personalized user model, which is compiled from user-specific electronic content and/or interactions with computing devices. Such applications may include, for example, spell-checking programs and automated content delivery systems.

The invention claimed is:

1. An information retrieval system comprising, embodied in one or more non-transitory machine accessible storage media:
   an electronic content and interaction analyzer module to cause one or more computing devices to generate user-specific semantic information for a plurality of pieces of stored content and interactions data;
   a query developer module to cause the one or more computing devices to:
      with the user-specific semantic information, interpret a search request; and
      based on the interpretation of the search request, develop a search query reflecting the user-specific semantic information; and
   a query executer module to cause the one or more computing devices to:
      execute the search query to obtain query results; and
      output a representation of the query results to an output device of the one or more computing devices;
   wherein the electronic content and interaction analyzer module is to extract a plurality of instances of a word from the stored content and interactions data, associate different user-specific semantic information with different instances of the extracted word, and store data indicative of the associations of different user-specific semantic information with different instances of the extracted word in a user-specific model, and wherein the query developer module is to interface with the user-specific model to develop the search query.

2. The information retrieval system of claim 1, wherein the query developer module is to formulate a plurality of alternative search requests based on the user-specific semantic information, output the alternative search requests, receive an interactive selection of at least one of the alternative search requests, and formulate the search query based on the selected alternative search request.

3. The information retrieval system of claim 1, wherein the electronic content and interaction analyzer module is to periodically update the user-specific semantic information in response to new content and interactions data.

4. The information retrieval system of claim 1, wherein the electronic content and interaction analyzer module is to create an index of most important words in the stored content and interactions data and store the index in a user-specific model, and wherein the query developer module is to interface with the user-specific model to develop the search query.

5. The information retrieval system of claim 1, wherein the electronic content and interaction analyzer module is to perform a similarity analysis of pieces of the stored content and interactions data, calculate similarity scores indicative of similarities between pieces of the stored content and interactions data, and store the similarity scores in a user-specific model, and wherein the query developer module is to interface with the user-specific model to develop the search query.

6. The information retrieval system of claim 1, wherein the electronic content and interaction analyzer module is to assign weights to pieces of the stored content and interactions data based on one or more of frequency of use and recency of use, and store the weights in a user-specific model, and wherein the query developer module is to interface with the user-specific model to develop the search query.

7. The information retrieval system of claim 1, wherein the electronic content and interaction analyzer module is to associate different content or activity types with different pieces of the stored content or interactions data and store data indicative of the associations of different content or activity types with different pieces of the stored content or interactions data in a user-specific model, and wherein the query developer module is to interface with the user-specific model to develop the search query.

8. The information retrieval system of claim 1, wherein the electronic content and interaction analyzer module is to identify words that are related to words or information in the stored content and interactions data, classify the relationship between the identified words and the words or information in the stored content and interactions data according to relationship types, and store the related words and data indicative of the relationship types in a user-specific model, and wherein the query developer is to include one or more of the related words in the search query.

9. The information retrieval system of claim 1, wherein the electronic content and interaction analyzer module is to associate words in the stored content and interactions data with topics, and store data indicative of the associations of words and topics in a user-specific model, and the query executer is to interface with the user-specific model to identify a plurality of alternative topics.

10. The information retrieval system of claim 1, wherein the query developer module comprises a query interpreter module to determine user-specific meanings of individual search terms of a search request, and the query developer module is to include the user-specific meanings of the individual search terms of the search request in the search query.

11. The information retrieval system of claim 10, wherein the query developer module comprises a query augmenter module to analyze the user-specific meanings of search terms output by the query interpreter module and identify a new search term related to an individual search term of the search request, and the query developer module is to include the new search term in the search query.

12. The information retrieval system of claim 10, wherein the query interpreter module comprises a plurality of search term analyzer modules including at least two of: a topic analyzer module, a heat map analyzer module, a semantic analyzer module, a context analyzer module, and a query history analyzer module, each of the search term analyzer modules is to interface with a user-specific model to perform a different type of analysis of the search request, and the query interpreter module utilizes output from the search term analyzer modules to annotate the search request.

13. The information retrieval system of claim 10, wherein the query developer module comprises a query corrector module to interface with a user-specific model to determine a user-specific correction of a search term and annotate the search request to include the user-specific correction of the search term.

14. The information retrieval system of claim 1, wherein the query executer module is to identify a plurality of alternative topics by analyzing the query results; output the plurality of alternative topics to an output device of the one or more computing devices; receive an interactive selection of at least one of the plurality of alternative topics via an input device of the one or more computing devices; and output query results associated with the selected topic to the output device.

15. One or more non-transitory computer accessible storage media comprising a plurality of instructions that in response to being executed, result in a computing device:
generating, for a user, user-specific semantic information from stored content and interactions data of the user;
receiving a search request from the user;
based on the search request, developing a search query including at least some of the user-specific semantic information;
executing the search query;
with the user-specific semantic information, analyzing results of the execution of the search query; and
presenting output in response to the search query in accordance with the analysis of the results of the execution of the search query;
wherein the developing search query further comprises to extract a plurality of instances of a word from the stored content and interactions data, associate different user-specific semantic information with different instances of the extracted word, and store data indicative of the associations of different user-specific semantic information with different instances of the extracted word in a user-specific model, and interface with the user-specific model to develop the search query.

16. The one or more non-transitory computer accessible media of claim 15, wherein said analyzing results of the execution further comprises executing a clustering algorithm to cluster the results of the execution of the search query into a plurality of alternative topics, wherein the plurality of alternative topics are determined at least in part based on the user-specific semantic information.

17. The one or more non-transitory computer accessible media of claim 15, wherein said analyzing results of the execution further comprises identifying a plurality of alternative topics based on the user-specific semantic information; outputting the plurality of alternative topics; and receiving an interactive selection of one or more of the plurality of alternative topics; and said presenting output comprises outputting query results associated with the selected topic.

18. A computing device comprising:
at least one processor,
an input device coupled to the at least one processor;
an output device coupled to the at least one processor; and
at least one memory device coupled to the at least one processor, the at least one memory device having stored therein a plurality of instructions that when executed by the at least one processor cause the at least one processor to:
periodically, over time, for a user, generate user-specific semantic information from stored content and interactions data of the user;
receive a search request;
develop a plurality of alternative search queries, each alternative search query corresponding to the search request and including a different set of the user-specific semantic information; and
output data indicative of results of executing each of the alternative search queries;
wherein developing a plurality of alternative search queries further comprises the steps to:
extract a plurality of instances of a word from the stored content and interactions data;
associate different user-specific semantic information with different instances of the extracted word;
store data indicative of the associations of different user-specific semantic information with different instances of the extracted word in a user-specific model; and
interface with the user-specific model to develop the search query.

19. The computing device of claim 18, wherein to output data indicative of results of executing each of the alternative search queries comprises displaying a plurality of different topics, each topic indicative of the results of execution of one of the alternative search queries.

* * * * *